United States Patent Office 3,219,624
Patented Nov. 23, 1965

3,219,624
EPOXY ORGANOPOLYSILOXANES
Merrill Cohen, Marblehead, Mass., assignor to General Electric Company, a corporation of New York
No Drawing. Filed Apr. 25, 1960, Ser. No. 24,201
4 Claims. (Cl. 260—46.5)

The present invention relates to novel epoxy organopolysiloxanes and to a process for making them. More particularly, the present invention relates to the epoxidation of certain organopolysiloxanes containing epoxidizable ethylenically unsaturated organo radicals attached to silicon by carbon-silicon linkages, and to the epoxy organopolysiloxanes containing oxirane oxygen produced thereby.

The novel compounds of the present invention, hereinafter referred to sometimes as the "epoxy organopolysiloxanes" can be described as the reaction product, at an epoxide equivalent weight of about 60 to 20,000, of an organopolysiloxane and a peracid at temperatures in the range of 0° to 100° C., said organopolysiloxane having a ratio of from one to three organo radicals per silicon atom, said organo radicals being attached to silicon by carbon-silicon linkages and including at least one epoxidizable ethylenically unsaturated organo radical with the remaining organo radicals being members selected from the class consisting of monovalent hydrocarbon radicals, halogenated monovalent hydrocarbon radicals and cyanoalkyl radicals.

A preferred variety of the epoxy organopolysiloxanes have the formula:

(1)
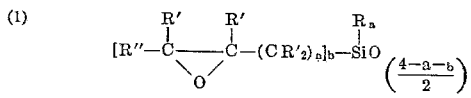

where $a$ is equal to from 0 to 2.5, inclusive, preferably 0.6 to 2.5, $b$ is equal to from .01 to 3, inclusive, and the sum of $a$ and $b$ is equal to from 1 to 3, inclusive, $n$ is a whole number equal to 0 to 10 inclusive, R is a member selected from the class of monovalent hydrocarbon radicals, halogenated monovalent hydrocarbon radicals and cyanoalkyl radicals, R' is a member selected from the class of hydrogen and lower alkyl radicals, and R" is a member selected from the class of hydrogen, monovalent hydrocarbon radicals free of ethylenic unsaturation, and halogenated monovalent hydrocarbon radicals free of ethylenic unsaturation.

The present invention is based on the discovery that valuable epoxy organopolysiloxanes are produced by reacting organopolysiloxane compounds corresponding to the following formula:

(2)
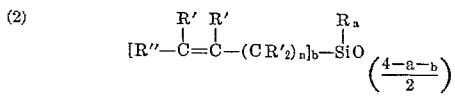

where $a$, $b$, $n$, R, R' and R" are as defined in Formula 1, with peracids such as peracetic acid.

The organopolysiloxanes of Formula 2 hereinafter referred to sometimes as the "unsaturated siloxanes" can be further described as an organopolysiloxane having at least one or more epoxidizable ethylenically unsaturated organo radicals attached to silicon by carbon-silicon linkage, and containing a ratio of 1 to 3 organo radicals per silicon atom.

An epoxidizable ethylenically unsaturated organo radical is an organo radical free of conjugation with carboxyl radicals and free of radicals such as nitro and halo that would tend to substantially interfere with normal epoxidation.

The peracids that are employed in the present invention to produce the novel epoxy organopolysiloxanes include, peracetic acid, perbenzoic acid, monoperphthalic acid and the like. Peracetic is the preferred acid for epoxidizing and can be utilized directly or generated in situ in acetic acid with a peroxide such as hydrogen peroxide. An operable concentration of peracetic acid in acetic is from about 20 to 60 percent while a preferred range is about 40 percent.

The epoxy organopolysiloxanes of the present invention include epoxidized siloxane resins, epoxidized siloxane fluids, and other epoxy siloxane materials having an epoxy equivalent weight extending over a range of from about 60 to 20,000, where there is a ratio of from one to three organo radicals per silicon atom, said organo radicals being attached to silicon by carbon-silicon linkages. The epoxy equivalent weight is the weight of organopolysiloxane material containing an equivalent of an epoxide radical.

When the ratio of the organo radicals to silicon in the epoxy organopolysiloxane is in the range of about 2 or above, and the epoxy equivalent weight is 2500 and above, the compounds of the present invention have been found to be valuable as lubricants. In addition to being lubricants the epoxy siloxane compounds of the present invention are also valuable as plasticizers, and stabilizers for synthetic resins, particularly vinyl resins such as polyvinylchloride resins.

Certain of the epoxy organopolysiloxane compositions of the present invention are also curable to the solid insoluble state when catalyzed by active hydrogen compounds such as amines like piperidine etc., and are valuable as encapsulating materials for electrical components such as condensers, etc. Although the reason why certain of these epoxy compounds heat cure is outside the scope of this invention, it is believed that curing is dependent on such factors as a proper degree of epoxide functionality i.e. a sufficient number of molecules containing a plurality of reactive epoxide sites, in addition to a minimum effective over-all epoxide content.

A preferred class of the heat curable, or active hydrogen catalyzable epoxy organopolysiloxane compositions of the present invention fall within a range of epoxide equivalent weights of about 100 to 7,000 and an R to Si ratio of 1 to 3 with 2 to 3 particularly preferred. The curable epoxy organopolysiloxane compositions of the present invention are also valuable in potting and casting applications and as coating and adhesive materials.

R of Formula 2 is more particularly illustrated by alkyl radicals, including methyl, ethyl, propyl, octyl, etc. radicals; aryl radicals, including phenyl, diphenyl, naphthyl, tolyl, xylyl, etc. radicals; aralkyl radicals, including benzyl, phenylethyl, etc. radicals; alkenyl radicals including vinyl, propenyl, butenyl etc. radicals; cyanoalkyl radicals, including cyanoethyl, cyanopropyl etc. radicals; and halogenated monovalent hydrocarbon radicals, including chloromethyl, chlorophenyl, fluoroethyl, tetrachlorophenyl etc. radicals. R' is more particularly methyl, ethyl, etc. radicals, where the radicals can be all the same or a mixture of one or more members of the class i.e. all methyl, or mixtures of hydrogen, methyl, ethyl, etc.; and R" is more particularly alkyl, aralkyl, aryl and halogenated derivatives thereof, including methyl, ethyl, phenyl, benzyl, chlorophenyl, chloroethyl, fluorethyl etc. radicals. R is preferably methyl, phenyl and cyanoethyl; R' is preferably hydrogen, and R" is preferably hydrogen and lower alkyl.

The syntheses of the unsaturated siloxane compounds of the present invention by either the hydrolysis of mixtures of organohalosilanes having at least some silane members with epoxidizable organo groups attached to silicon by carbon-silicon linkages or by the equilibration of appropriate cyclic organosiloxane mixtures are well known in the art. The procedures illustrated by the Rochow Patents 2,258,218, 2,258,219, etc. Patnode patents 2,306,222, 2,380,997, Bluestein application Serial No. 852,219, filed November 12, 1959, now U.S. Patent 2,992,083, and assigned to the same assignee of the present invention and Rochow, Chemistry of the Silicones, second edition, John Wiley and Sons, New York (1951), can be satisfactorily employed in producing the unsaturated siloxane compositions of the present invention, with the appropriate silane or siloxane reactants containing ethylenically unsaturated radicals attached to silicon by carbon-silicon linkages. The unsaturated siloxane compositions of the present invention preferably contain at least 20 to as high as 70 mole percent of epoxidizable ethylenically unsaturated organo radicals attached to silicon by carbon-silicon linkages, based on the total number of organo radicals in the organopolysiloxane.

In the preparation of the epoxy organopolysiloxanes of the present invention an unsaturated siloxane is reacted with a suitable peracid. The unsaturated siloxane can be reacted directly with the peracid or the peracid can be generated in situ as in the case of peracetic acid when adding hydrogen peroxide to a mixture of acetic acid and the unsaturated siloxane.

It has been found expedient to conduct the reaction in the presence of a suitable organic solvent to avoid undesirable side reactions and to facilitate recovery of the final reaction product. A suitable organic solvent is any organic solvent which is inert to the reactants under the conditions of reaction, which includes solvents such as benzene, toluene, dioxane and the like.

It is desirable to stir the reaction mixture to effect greater contact between the reactants, particularly in the event of two phase systems which can occur for example, when epoxidizing higher molecular weight unsaturated organopolysiloxane or when organic solvents are employed with peracetic acid in acetic acid.

Depending on the concentration of the peracid employed, the reaction temperature, the degree of epoxidizable unsaturation of the unsaturated organopolysiloxane, the length of reaction time, etc., the final oxirane oxygen content in the epoxy organopolysiloxane product will vary considerably.

Although the relative amounts of peracid and unsaturated siloxane that are reacted to produce the compositions of the present invention are not critical, a convenient guide is to react at least a stoichiometric amount to an excess of peracid equivalent to from one to ten times the available epoxidizable unsaturation of the unsaturated siloxane employed.

Temperatures at which the reaction can be conducted will largely be limited only by the physical properties of the reactants. It is preferred however, particularly when epoxidizing with peracetic acid, to conduct the reaction at temperatures in the range of 25 to 75 degrees centigrade. The reaction is broadly operable however, over a range of between zero degrees centigrade to 100° centigrade.

The reaction time will vary widely and will largely be dependent on such factors as molecular weight of the unsaturated siloxane reactant, concentration of the reactants, temperature of the reaction, degree of agitation of the reaction mixture, etc. Thus reaction time as little as 1 hour or less, to several weeks or more, will not be unusual.

The stage at which the reaction terminates is frequently difficult to determine directly as it often bears little relation to the end point of theoretical epoxidation. A indirect procedure that can be employed to determine the end of the reaction is to withdraw aliquots of the phases periodically, and back titrate, in order to plot the change, if any, in peracid concentration during the course of the reaction by the iodine determination. The iodine freed by the peracid is titrated to the starch end point with a thiosulphate solution. When the peracid ceases to react, the volatile organic solvent, if any, can be removed by known means including blowing a stream of air through the solution, vacuum distillation, etc. Any excess acid, including acetic acid, in the event that peracetic acid is employed, can be neutralized with standard neutralizing aids such as sodium bicarbonate, etc. and the product can be washed with water if desired. Additional treatment of the product, such as with standard drying aids, etc. can be employed, if it appears necessary.

In calculating the epoxide content in the final reaction product the following procedure hereinafter referred to sometimes as "the pyridinium hydrochloride method" can be employed. In this procedure two grams of the epoxy organopolysiloxane product is refluxed with 20 ml. of a solution of 16 ml. concentrated HCl diluted to one liter with pyridine. The solution is then titrated to the phenolphthalein end point with 0.1 N sodium hydroxide. The weight of the reaction product (two grams) divided by the equivalents of HCl consumed in the process is the epoxide equivalent (the weight of material containing one equivalent of an epoxide group).

In order that those skilled in the art will be better able to practice the present invention, the following examples are given by way of illustration and not by way of limitation. All parts are by weight.

*Example 1*

A two phase solution of 87 parts of toluene, 11 parts of a 40% peracetic acid solution in acetic acid containing 2% sodium acetate and 11 parts of 1,3,5,7-tetravinyl-1,3,5,7-tetramethylcyclotetrasiloxane was prepared. The solution was stirred for a period of thirty-five hours. The toluene phase was washed with water, a 5% sodium bicarbonate solution, and then water, and dried over sodium sulphate. The solution was then stripped in vacuo, and the residue (5.7 parts) was tested for epoxide content employing the pyridinium hydrochloride method. The epoxide equivalent was found to be 397±15. Comparison with the infra-red spectra of the siloxane before treatment with peracetic acid showed new absorption peaks at 7.58, 8.15 and 11.38 microns characteristic of the epoxide function. Based on its epoxide equivalent weight and infra-red data the compound was

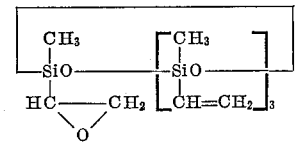

*Example 2*

A reaction mixture was prepared containing 10 parts of tetramethyldivinyldisiloxane, 11.5 parts of 40% peracetic acid in acetic acid containing 2% sodium acetate, and 103 parts of dioxane.

After 11 days at room temperature during which time the mixture had been stirred a total of 80 hours over a ten day period, the dioxane was evaporated and the reaction product was extracted with ether and washed with a solution of water and sodium bicarbonate. After drying over sodium sulphate and removing the dioxane by stripping under reduced pressure, the epoxide equivalent of the final product (4 parts) was found to be 226. The infra-red analysis of the product showed new absorption peaks at 7.58, 8.15 and 11.38 microns. The formula of the compound was:

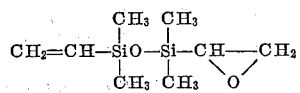

*Example 3*

An organopolysiloxane oil with a viscosity of 28.7 centistokes was prepared by heating a mixture of 113 parts of octamethylcyclotetrasiloxane and 9.8 parts of tetramethyldivinyldisiloxane in the presence of 0.1 percent, based on the weight of the mixture, of potassium hydroxide. The mixture was heated under nitrogen in a sealed reaction vessel for 32 hours at 145° C., and 2 hours at 155° C. A mixture of 51 parts of the resulting oil, 11.5 parts of 40% peracetic acid in acetic acid containing 2% sodium acetate, and 132 parts of benzene was allowed to react for five days at room temperature, being stirred for approximately 24 hours during this period. The final product was recovered by the usual neutralization, washing and stripping procedures. The epoxide equivalent of the product (37 parts) was found to be 2630 and the infra-red absorption spectrum of the oil showed a faint absorption peak at 7.58 microns. The formula of the product was

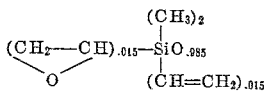

based on its epoxide equivalent weight, viscosity and infra-red data.

*Example 4*

A vinyl-containing silicone oil was prepared by stirring and heating 3.1 parts of 1,3,5,7-tetravinyl-1,3,5,7-tetramethylcyclotetrasiloxane, 30.3 parts of octamethylcyclotetrasiloxane, 0.3 part of hexamethyldisiloxane and 0.007 part of powdered KOH for 4 hours at 125 to 140° C. A mixture of 25 parts of the resulting oil, 11.5 parts of a 40% peracetic acid in acetic acid solution containing 2% sodium acetate, and 95 parts of toluene were reacted at room temperatures for two weeks. About 18 parts of the final product was obtained which had an epoxide equivalent of 1000. The formula of the product was

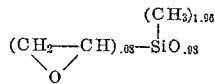

*Example 5*

A mixture of 150 parts of dimethyldichlorosilane, 11 parts of diallyldichlorosilane and 1 part of trimethylchlorosilane were cohydrolyzed in water. The mixture was washed with bicarbonate solution, dried over sodium carbonate and 25.7 parts of the resulting oil was added to a mixture of 86 parts of toluene and about 11.5 parts of 40% peracetic acid in acetic acid containing 2% sodium acetate. A temperature of 30° C. was maintained by a slightly exothermic reaction while the mixture was stirred for 1 hour. The mixture was then stirred for an additional 5 hours and then let set overnight. After an additional 21 hours the final product, about 18.5 parts, was recovered after the usual bicarbonate and stripping procedure, and the epoxide equivalent was found to be 8500. Its formula was

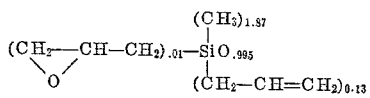

*Example 6*

An allyl containing polysiloxane oil was prepared by hydrolyzing 150 parts of dimethyldichlorosilane, 21.8 parts of diallyldichlorosilane and 1 part trimethylchlorosilane in an ether-water mixture. A mixture of 23.7 parts of the resulting siloxane, and 0.25 part of hexamethyldisiloxane was equilibrated for 1 hour at 135° C. and 2 hours at 125° C. in the presence of 0.007 part of KOH. The resulting product was treated with peracetic acid in accordance with the procedure of Example 6 and the epoxide equivalent of the resulting product

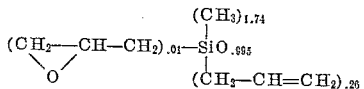

was found to be 8,700±1050.

*Example 7*

A solution of 45 parts of the unepoxidized siloxane of Example 3 in 132 parts benzene was treated with 11.5 parts of 40% peracetic acid in acetic acid containing 2% sodium acetate for two days. During this time the stirred reaction mixture was maintained between 60 to 70° C. for nine hours. The isolated product,

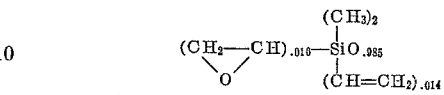

had an epoxide equivalent weight of 2460 and a viscosity of 35.7 centistokes at 80° F. Infra-red data confirmed its epoxide content.

*Example 8*

The steel on steel lubricity of the epoxidized organopolysiloxanes of Examples 4 and 7 were determined in a Shell four ball wear tester at 600 r.p.m. in a one hour test under a 50 kilogram load. A wear scar of 2 millimeter diameter was formed with the composition of Example 4 and a wear scar of 2.04 millimeters diameter resulted when the composition of Example 7 was used. This compares with a wear scar of 3 millimeters which is observed when a 35 centistoke methylphenyl silicone fluid is tested under the same conditions. When the composition of Example 4 was tested with steel against bronze utilizing a 10 kilogram load under the same conditions used with the 50 kilogram load, a wear scar of 1.6 millimeters resulted. Under similar test conditions a wear scar of 2.1 millimeters resulted with the methylphenyl silicone fluid.

*Example 9*

Another epoxidized oil was prepared by epoxidizing a KOH equilibrated mixture of 1,3,5,7-tetravinyl-1,3,5,7-tetramethylcyclotetrasiloxane, hexamethyldisiloxane and octamethylcyclotetrasiloxane in the presence of 0.1% phenyl β-naphthyl amine. This oil had a viscosity of 744 centistokes at 80° F. This oil gave a wear scar of 1.85 mm. diameter, steel against steel, at 50 kilogram load under the conditions of Example 8, and a scar of 0.73 mm., steel against bronze, at 10 kilogram load. The epoxide equivalent of the oil was about 14,000.

*Example 10*

A mixture of 3.6 parts of 1,3,5,7-tetravinyl-1,3,5,7-tetramethylcyclotetrasiloxane, 29.6 parts of octamethylcyclotetrasiloxane, and 1 part of hexamethyldisiloxane was heated with .017 parts of KOH in the presence of 0.021 part of phenyl β-naphthyl amine by stirring the mixture for 1 hour at a temperature of 145 to 150° C. An organopolysiloxane oil having a viscosity of 5,282 centistokes at 80° F. was prepared by adding .8 part of hexamethyldisiloxane to the equilibrated product and stirring the resulting mixture for 22 hours at 145 to 150° C.

A two phase mixture of 24 parts of the above unsaturated siloxane, 132 parts of benzene and 20 parts of 40% peracetic acid in acetic acid containing 2% by weight of sodium acetate was stirred at 60 to 70° C. for 9 hours during a three day period. The mixture was then stirred an additional 16 hours at 60 to 70° C. after standing 11 days at room temperature. After 5 more days at room temperature, the final product was recovered according to the usual procedure of stripping and washing with bicarbonate, etc. and had a viscosity of 3,242 centistokes at 80° F. and an epoxide equivalent weight of 1,181.

Ten parts of the final product are mixed with about ½ to 1 part of piperidine and an electronic component in the form of an condenser is immersed in the mixture and heated at 80 to 100° C. for several hours to gel the mixture. The encapsulated condenser is then post cured for an additional three hours at 150° C. whereby a brown impervious coating is formed on the condenser that is hard and non-tacky.

Example 11

A mixture of one part hexamethyldisiloxane, 2 parts 1,3,5,7-tetravinyl-1,3,5,7-tetramethylcyclotetrasiloxane, 90 parts of octamethylcyclotetrasiloxane and .02 part potassium hydroxide were heated for four hours at 150° C. Two parts of hexamethyldisiloxane were added and the mixture was heated three hours at 140-150° C. Two more parts of hexamethyldisiloxane were added and the mixture was heated 8 hours at 145° C., giving an oil with a viscosity of 60 centistokes at 80° F.

Fifty parts of the resulting oil were epoxidized with benzene and 40% peracetic acid in acetic acid at 65° C. and yielded twenty parts of an oil of 2994 centistoke viscosity, with an epoxide equivalent of 6850,

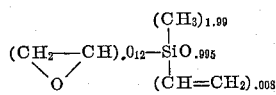

When heated a few hours at 175° C. to remove residual benzene and catalyzed by about 1% of piperidine by weight, the epoxidized product set to a rubbery solid after 15 hours at 100° C. and four hours at 150° C.

Example 12

Twenty five parts of 1,3,5,7-tetravinyl-1,3,5,7-tetramethylcyclotetrasiloxane were epoxidized in a benzene solution with 55 parts of 40% peracetic acid in acetic acid solution, containing 2% sodium acetate. After a reaction time of 16 days at room temperature, 13 parts of the product

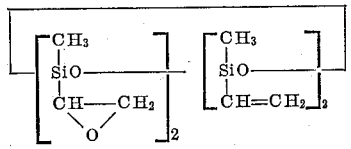

were isolated with an epoxide equivalent weight of 185±3. The product is mixed with 5 to 10% of piperidine and the mixture is poured on a standard 3 megohm resistor. The encapsulated resistor is heated at 70° C. for a few hours and the amine catalyzed mixture sets to a hard non-tacky coating. Other amines such as aminomethylpentamethyldisiloxane, and bis-pentamethyldisiloxanyl methyl amine are also effective as curing catalysts.

While the foregoing examples have of necessity described only a few of the very many compositions within the scope of the present invention, it should be understood that the present invention is directed to the entire class of epoxy organopolysiloxanes wihin the scope of the invention, and as particularly illustrated by Formula 1 and to the preparation of these materials by reacting the unsaturated siloxanes of the present invention particularly those of Formula 2 with a suitable peracid.

What I claim as new and desire to secure by Letters Patent of the United States is:

1. A process comprising (1) reacting at a temperature in the range of from 0° C. to 100° C., peracetic acid and a methylsiloxane selected from the class consisting of 1,3-divinyltetramethyldisiloxane and 1,3,5,7-tetravinyl-1,3,5,7-tetramethylcyclotetrasiloxane, and (2) recovering from (1), an epoxy methylpolysiloxane reaction product.

2. An epoxy methylcyclopolysiloxane having the formula

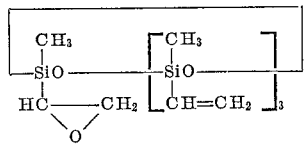

3. An epoxy methylcyclopolysiloxane having the formula

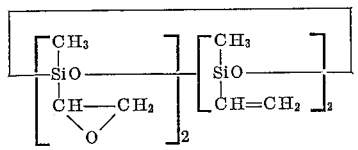

4. An epoxy methyldisiloxane having the formula

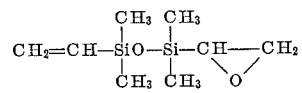

References Cited by the Examiner

UNITED STATES PATENTS

| | | | |
|---|---|---|---|
| 2,946,701 | 7/1960 | Plueddemann | 260—448.2 |
| 2,951,860 | 9/1960 | Plueddemann | 260—448.2 |
| 2,997,458 | 8/1961 | Lewis | 260—448.2 |
| 3,131,161 | 4/1964 | Nitzsche et al. | 260—448.2 |

FOREIGN PATENTS

| | | |
|---|---|---|
| 580,908 | 8/1959 | Canada. |
| 1,185,009 | 2/1959 | France. |
| 1,061,321 | 7/1959 | Germany. |
| 750,534 | 6/1956 | Great Britain. |

OTHER REFERENCES

Heterocyclic Compounds (Elderfield), publ. John Wiley & Sons, Inc. (N.Y.), 1950, vol. 1, pp. 3-8 relied on.

Dow Corning New Products Information Bulletin No. Q-2-101, December 1957.

Sadykh-Zade et al.: Doklady Akad. Nauk S.S.S.R., vol. 118, pp. 723-6, 1958.

Plueddemann et al.: J.A.C.S., vol. 81, pp. 2632-5, June 5, 1959.

LEON J. BERCOVITZ, *Primary Examiner*.

MILTON STERMAN, HAROLD N. BURSTEIN, WILLIAM H. SHORT, MURRAY TILLMAN,
*Examiners*.